(12) United States Patent
Lee

(10) Patent No.: US 11,694,071 B2
(45) Date of Patent: Jul. 4, 2023

(54) OPTICAL NEURAL NETWORK APPARATUS INCLUDING PASSIVE PHASE MODULATOR

(71) Applicant: SAMSUNG ELECTRONICS CO., LTD., Suwon-si (KR)

(72) Inventor: Duhyun Lee, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 1062 days.

(21) Appl. No.: 16/434,957

(22) Filed: Jun. 7, 2019

(65) Prior Publication Data

US 2020/0242463 A1 Jul. 30, 2020

(30) Foreign Application Priority Data

Jan. 24, 2019 (KR) ........................ 10-2019-0009238

(51) Int. Cl.
*G06N 3/067* (2006.01)
*G02B 5/18* (2006.01)
(Continued)

(52) U.S. Cl.
CPC ......... *G06N 3/0675* (2013.01); *G02B 5/1809* (2013.01); *G06V 10/10* (2022.01); *G06V 10/147* (2022.01); *G06V 10/764* (2022.01); *G06V 10/955* (2022.01); *G02F 2203/12* (2013.01); *G02F 2203/50* (2013.01); *G06V 30/10* (2022.01)

(58) Field of Classification Search
CPC .............. G02B 5/1809; G02F 2203/12; G02F 2203/50; G06K 9/627; G06N 3/04; G06N 3/0675; G06N 3/08; G06V 10/10; G06V 10/147; G06V 10/764; G06V 10/955; G06V 30/10
See application file for complete search history.

(56) References Cited

U.S. PATENT DOCUMENTS

| 5,497,253 A | 3/1996 | Stoll et al. |
| 9,739,918 B2 | 8/2017 | Arbabi et al. |

(Continued)

FOREIGN PATENT DOCUMENTS

| JP | 04205891 A | 7/1992 |
| JP | 2017-527857 A | 9/2017 |

(Continued)

OTHER PUBLICATIONS

Xing Lin et al. "All-optical machine learning using diffractive deep neural networks" Science, Optical Computing, vol. 361, Sep. 7, 2018 (6 pages total).

(Continued)

*Primary Examiner* — Joseph P Martinez
*Assistant Examiner* — Vipin Patel
(74) *Attorney, Agent, or Firm* — Sughrue Mion, PLLC

(57) ABSTRACT

An optical neural network apparatus that optically implements an artificial neural network includes an input layer, a hidden layer, and an output layer sequentially arranged in a traveling direction of light, wherein the output layer includes an image sensor including a plurality of light sensing pixels arranged in two dimensions, and wherein the input layer or the hidden layer includes at least one passive phase modulator configured to locally modulate a phase of incident light depending on positions on a two dimensional plane.

30 Claims, 15 Drawing Sheets

(51) Int. Cl.
  *G06V 10/10* (2022.01)
  *G06V 10/764* (2022.01)
  *G06V 10/147* (2022.01)
  *G06V 10/94* (2022.01)
  *G06V 30/10* (2022.01)

(56) References Cited

U.S. PATENT DOCUMENTS

| | | | |
|---|---|---|---|
| 2006/0245456 A1* | 11/2006 | Lasri | H01S 3/1118 372/18 |
| 2010/0176278 A1 | 7/2010 | Yokoyama | |
| 2010/0226608 A1* | 9/2010 | Chen | G02B 6/1225 264/1.25 |
| 2017/0351293 A1* | 12/2017 | Carolan | G06E 3/006 |
| 2018/0156949 A1 | 6/2018 | Tsai et al. | |

FOREIGN PATENT DOCUMENTS

| | | | |
|---|---|---|---|
| KR | 10-1472682 B1 | 12/2014 | |
| KR | 20180063835 A | * 6/2018 | ............... G03H 1/22 |

OTHER PUBLICATIONS

NIST "NIST Chip Lights Up Optical Neural Network Demo" Jul. 26, 2018, retrieved from [https://www.nist.gov/news-events/news/2018/07/nist-chip-lights-optical-neural-network-demoNIST] (3 pages total).

Ali Shafiee et al. "ISAAC: A Convolutional Neural Network Accelerator with In-Situ Analog Arithmetic in Crossbars" ACM SIGARCH Computer Architecture News, Jun. 2016, (14 pages total).

Communication dated Feb. 14, 2020 from the European Patent Office in application No. 19183013.2.

Chu, C., et al., "Active dielectric metasurface based on phase-change medium", Laser & Photonics Reviews, vol. 10, No. 6, Oct. 12, 2016, pp. 986-994 (9 pages), XP055409051.

* cited by examiner

OPTICAL NEURAL NETWORK APPARATUS INCLUDING PASSIVE PHASE MODULATOR

CROSS-REFERENCE TO RELATED APPLICATION

This application claims the benefit of Korean Patent Application No. 10-2019-0009238, filed on Jan. 24, 2019, in the Korean Intellectual Property Office, the disclosure of which is incorporated herein in its entirety by reference.

BACKGROUND

1. Field

The present disclosure relates to optical neural network apparatuses, and more particularly, to optical neural network apparatuses including a passive phase modulator including very small phase shifting elements.

2. Description of the Related Art

Artificial neural networks are machine learning techniques that process information in a manner similar to the human brain. Recently, artificial neural networks have achieved great results as computer performance has dramatically improved and learning through big data has become possible.

An artificial neural network includes an input layer, a hidden layer, and an output layer, and each layer has a plurality of nodes that are units for processing information. Weights are given when information is transferred from nodes of the input layer to nodes of the hidden layer, and weights are given also when information is transferred from the nodes of the hidden layer to nodes of the output layer. Learning is performed by adjusting the weights of a plurality of nodes based on an error of the output layer to minimize the error of the output layer finally. There may be only one hidden layer, but there may be a plurality of hidden layers. An artificial neural network with a plurality of hidden layers is generally called a deep neural network, and learning through the deep neural network is called deep learning.

The artificial neural network may be implemented by software or by a dedicated electronic circuit. An artificial neural network implemented by software may be slowed down due to a large amount of computations. On the other hand, when an artificial neural network is implemented with a dedicated electronic circuit, wiring for connecting nodes in adjacent layers may be complicated.

SUMMARY

According to an aspect of an embodiment, an optical neural network apparatus includes an input layer, a hidden layer, and an output layer sequentially arranged in a traveling direction of light, wherein the output layer comprises an image sensor, the image sensor comprising a plurality of light sensing pixels arranged in two dimensions, and wherein the input layer or the hidden layer comprises at least one passive phase modulator configured to modulate a phase of incident light based on an incident position of the incident light on a two dimensional plane of the at least one passive phase modulator.

The at least one passive phase modulator may include a transparent substrate; and a plurality of phase shifting elements arranged on the substrate.

Each phase shifting element from among the plurality of phase shifting elements may have a respective refractive index higher than a refractive index of the substrate.

Each phase shifting element from among the plurality of phase shifting elements may have a shape of a column arranged on the substrate.

Each of respective diameters of the plurality of phase shifting elements may be less than a wavelength of incident light incident on the optical neural network apparatus.

Each phase shifting element from among the plurality of phase shifting elements may have a respective diameter based on a position of the phase shifting element on the substrate.

Each two-dimensional position on the at least one passive phase modulator may correspond to a respective weight obtained by pre-learning, and a respective diameter of each phase shifting element from among the plurality of phase shifting elements may be based on the respective weight corresponding to a position of the phase shifting element on the substrate.

Respective diameters of each phase shifting element from among the plurality of phase shifting elements of the at least one passive phase modulator may be randomly and irregularly determined, and light exiting the at least one passive phase modulator may be incident upon the image sensor.

The plurality of phase shifting elements may be regularly two-dimensionally arranged on the substrate.

An arrangement period of the plurality of phase shifting elements may be less than a wavelength of the incident light incident on the optical neural network apparatus.

The hidden layer may include a first hidden layer and a second hidden layer sequentially arranged in the traveling direction of light, the input layer may include at least one input passive phase modulator from among the at least one passive phase modulator, the first hidden layer may include at least one first hidden passive phase modulator from among the at least one passive phase modulator, and the second hidden layer may include at least one second hidden passive phase modulator from among the at least one passive phase modulator.

Respective phase modulation patterns of the at least one input passive phase modulator of the input layer, the at least one first hidden passive phase modulator of the first hidden layer, and the at least one second hidden passive phase modulator of the second hidden layer may be different from each other.

The input layer or the hidden layer may further include at least one active phase modulator configured to modulate the phase of the incident light by electrical control and based on an incident position of the incident light on a two dimensional plane of the at least one active phase modulator.

The at least one active phase modulator may include a spatial light modulator comprising a plurality of pixels arranged in two dimensions, and each pixel from among the plurality of pixels may be configured to independently modulate the phase of the incident light.

Each pixel from among the plurality of pixels may correspond to a respective weight obtained by pre-learning, and the at least one active phase modulator may be configured to control an operation of each pixel from among the plurality of pixels based on the weight.

The hidden layer may include a first hidden layer and a second hidden layer sequentially arranged in the traveling direction of light, the input layer may include at least one input active phase modulator from among the at least one active phase modulator, the first hidden layer may include at least one first hidden active phase modulator from among the at least one active phase modulator, and the second hidden layer may include at least one second hidden passive phase modulator from among the at least one passive phase modulator.

Respective phase modulation patterns of the at least one input active phase modulator of the input layer, the at least one first hidden active phase modulator of the first hidden layer, and the at least one second hidden passive phase modulator of the second hidden layer may be different from each other.

The at least one active phase modulator and the at least one passive phase modulator may include respective transmission-type modulators configured to transmit and modulate the incident light.

The second hidden layer may be located between the output layer and the first hidden layer, and the first hidden layer may be located between the second hidden layer and the input layer.

The hidden layer may include a first hidden layer and a second hidden layer sequentially arranged in the traveling direction of light, the input layer may include at least one input passive phase modulator from among the at least one passive phase modulator, the first hidden layer may include at least one first hidden passive phase modulator from among the at least one passive phase modulator, and the second hidden layer may include at least one second hidden active phase modulator from among the at least one active phase modulator.

The optical neural network apparatus may further include a transparent light guide plate; an input coupler located in a first region on a first surface of the light guide plate to guide incident light into the light guide plate; and an output coupler located in a second region on the first surface of the light guide plate to emit light from the light guide plate.

The input layer may be located outside the light guide plate and faces the input coupler, the hidden layer may be located on the first surface of the light guide plate or on a second surface of the light guide plate opposite to the first surface, and the output layer may be located outside the light guide plate and faces the output coupler.

The hidden layer may include a first hidden layer and a second hidden layer sequentially arranged in the traveling direction of light, the first hidden layer may be located on a second surface of the light guide plate opposite to the first surface, and the second hidden layer may be located between the first region and the second region on the first surface.

The input layer or the hidden layer may further include at least one active phase modulator configured to modulate the phase of the incident light by electrical control and based on an incident position of the incident light on a two dimensional plane of the at least one active phase modulator.

The at least one active phase modulator and the at least one passive phase modulator may include respective reflection-type modulators configured to reflect and modulate the incident light.

The output coupler may include the at least one passive phase modulator.

The optical neural network apparatus may further include a diffraction pattern located on the first surface of the light guide plate or on a second surface of the light guide plate opposite to the first surface, the diffraction pattern being configured to reflect the incident light.

The optical neural network apparatus may further include a transparent light guide plate; an input coupler located on a first surface of the light guide plate to guide incident light into the light guide plate; and an output coupler located on a second surface of the light guide plate opposite to the first surface to emit light from the light guide plate.

The optical neural network apparatus may further include a light source configured to provide coherent light to the input layer.

According to an aspect of an embodiment, an optical neural network apparatus includes a first phase modulator configured to modulate a phase of an incident light ray based on an incident position of the incident light ray on the first phase modulator and to emit a first modulated light ray; a second phase modulator configured to modulate a phase of the first modulated light ray emitted by the first phase modulator based on an incident position of the first modulated light ray on the second phase modulator and to emit a second modulated light ray; and a sensor configured to sense the second modulated light ray.

One of the first phase modulator and the second phase modulator may include an active phase modulator, and the other of the first phase modulator and the second phase modulator may include a passive phase modulator.

The passive phase modulator may include a plurality of columns arranged on a surface of a transparent substrate, and a respective diameter of each column from among the plurality of columns may be less than a wavelength of the incident light ray.

Each position on the first phase modulator and the second phase modulator may correspond to a respective weight from among a plurality of weights obtained by completion of pre-learning of a task, and each of the first phase modulator and the second phase modulator may be configured to modulate the phase of the incident light ray and the first modulated light ray, respectively, according to the plurality of weights.

An incident position of an incident light ray on the passive phase modulator may correspond to a weight from among a plurality of weights obtained by completion of pre-learning of a task, and a diameter of a column from among the plurality of columns located at the incident position may be determined according to the corresponding weight.

The optical neural network apparatus may further include a light guide plate, and the first phase modulator and the second phase modulator may be located on a surface of the light guide plate and configured to modulate and reflect incident light traveling through the light guide plate.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
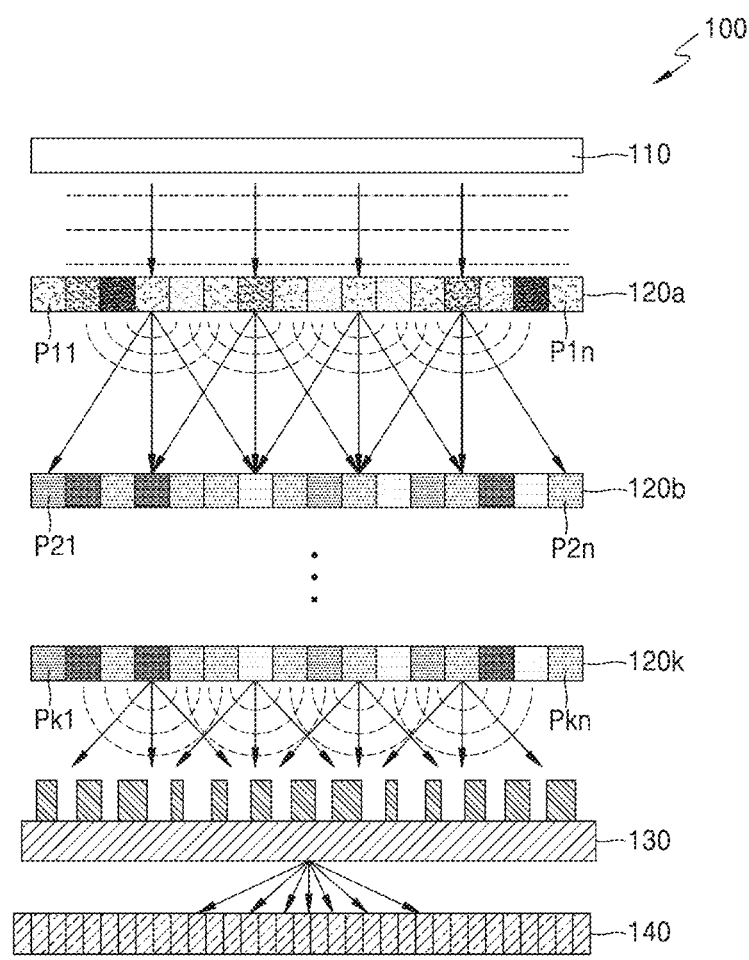
FIG. 1 is a conceptual diagram illustrating a schematic configuration of an optical neural network apparatus according to an embodiment.

Hereinafter, optical neural network apparatuses including a passive phase modulator will be described with reference to the accompanying drawings. In the drawings, like reference numerals refer to like elements, and the sizes of elements may be exaggerated for clarity of illustration. Embodiments described herein are for illustrative purposes only, and various modifications may be made therefrom. In the following description, when an element is referred to as being "above" or "on" another element in a layered structure, it may be directly on an upper, lower, left, or right side of the other element while making contact with the other element or may be above an upper, lower, left, or right side of the other element without making contact with the other element.

FIG. 1 is a conceptual diagram illustrating a schematic configuration of an optical neural network apparatus 100 according to an embodiment. Referring to FIG. 1, the optical neural network apparatus 100 according to the embodiment may include a plurality of active phase modulators, i.e., first to k-th active phase modulators 120a, 120b, . . . , and 120k, a passive phase modulator 130, and an image sensor 140. In addition, the optical neural network apparatus 100 may further include a light source 110 for providing coherent light. However, the optical neural network apparatus 100 is not necessarily fixedly coupled to the light source 110, and the optical neural network apparatus 100 may be manufactured, distributed, and sold separately from the light source 110.

Each of the first to k-th active phase modulators 120a, 120b, . . . , and 120k may be a spatial light modulator configured to actively modulate the phase of incident light by electrical control. For example, the first to k-th active phase modulators 120a, 120b, . . . , and 120k may be liquid crystal modulators using liquid crystals or semiconductor-based spatial light modulators. Also, the first to k-th active phase modulators 120a, 120b, . . . , and 120k may be transmission-type spatial light modulators that transmit and modulate incident light. Each of the first to k-th active phase modulators 120a, 120b, . . . , and 120k has a plurality of pixels arranged two-dimensionally, and each of the pixels may be independently driven to modulate the phase of the incident light. Accordingly, the first to k-th active phase modulators 120a, 120b, . . . , and 120k may locally modulate the phase of the incident light depending on positions on a two-dimensional plane. In other words, the first to k-th active phase modulators 120a, 120b, . . . , and 120k may modulate the phase of the incident light by electrical control based on an incident position of the incident light on a two-dimensional plane of the active phase modulator.

The first active phase modulator 120a located at the front in a light traveling direction may serve as an input layer of the optical neural network apparatus 100. Accordingly, light emitted from the light source 110 is first incident on the first active phase modulator 120a. The incident light may be incident on all pixels P11 to P1n of the first active phase modulator 120a with the same phase. The first active phase modulator 120a may modulate the phase of the incident light incident from the light source 110 differently depending on positions on a two-dimensional plane.

Figure 2:
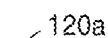
FIG. 2 illustrates a phase modulation by a plurality of pixels of a first active phase modulator of the optical neural network apparatus shown in FIG. 1.

For example, FIG. 2 illustrates a phase modulation by a plurality of pixels of the first active phase modulator 120a of the optical neural network apparatus 100 shown in FIG. 1. Referring to FIG. 2, pixels on a first pixel row of the first active phase modulator 120a may delay the phase of incident light by $\varphi_{00}, \varphi_{01}, \varphi_{02}, \varphi_{03}, \ldots$ from left to right to transmit the incident light. Pixels on a second pixel row of the first active phase modulator 120a may delay the phase of the incident light by $\varphi_{10}, \varphi_{11}, \varphi_{12}, \varphi_{13}, \ldots$ from left to right to transmit the incident light, pixels on a third pixel row of the first active phase modulator 120a may delay the phase of the incident light by $\varphi_{20}, \varphi_{21}, \varphi_{22}, \varphi_{23}, \ldots$ from left to right to transmit the incident light, and pixels on a fourth pixel row of the first active phase modulator 120a may delay the phase of the incident light by $\varphi_{30}, \varphi_{31}, \varphi_{32}, \varphi_{33}, \ldots$ from left to right to transmit the incident light. The degree of phase delay in each pixel may be electronically controlled. Each pixel of the first active phase modulator 120a may serve as a node of the input layer of the optical neural network apparatus 100. In addition, controlling a phase delay in each pixel has the same meaning as adjusting a weight at each node of the optical neural network apparatus 100. In other words, weights are applied to the incident light by a method of modulating the phase of the incident light in a plurality of pixels of the first active phase modulator 120a.

Light phase-modulated by the pixels P11 to P1n of the first active phase modulator 120a that is the input layer is incident on the second active phase modulator 120b. The second to k-th active phase modulators 120b, . . . , and 120k may serve as a hidden layer of the optical neural network apparatus 100. Although a case where the hidden layer includes a plurality of layers is shown in FIG. 1, the number of hidden layers may be variously selected, as needed, as at least one or more.

Light emitted from each of the pixels P11 to P1n of the first active phase modulator 120a may be incident on all pixels P21 to P2n of the second active phase modulator 120b. For example, light emitted from the pixel P11 of the first active phase modulator 120a may be incident on all the pixels P21 to P2n of the second active phase modulator 120b, and light emitted from the pixel P1n of the first active phase modulator 120a may also be incident on all the pixels P21 to P2n of the second active phase modulator 120b. Then, a certain interference pattern may be formed on the surface of the second active phase modulator 120b because light beams having different phases emitted from different pixels of the first active phase modulator 120a interfere with each other.

The second active phase modulator 120b may locally modulate the phase of incident light having the interference pattern. In other words, each of the pixels P21 to P2n of the second active phase modulator 120b may independently delay the phase of incident light, like the pixels P11 to P1n of the first active phase modulator 120a. The phase modulation by the second active phase modulator 120b may be different from the phase modulation by the first active phase modulator 120a. In other words, the first active phase modulator 120a and the second active phase modulator 120b may modulate the phase of incident light differently depending on positions on a two-dimensional plane. That is, the phase modulation patterns of the first active phase modulator 120a and the second active phase modulator 120b may be different from each other.

In this way, light may be transmitted to the k-th active phase modulator 120k, and a certain interference pattern may be formed on the surface of the k-th active phase modulator 120k while light beams having different phases interfere with each other. However, because the phase of light reaching the k-th active phase modulator 120k has changed in layers previous to the k-th active phase modulator 120k, the interference pattern formed on the surface of the k-th active phase modulator 120k may have a different form from the interference pattern formed on the surface of the second active phase modulator 120b. Each of pixels Pk1 to Pkn of the k-th active phase modulator 120k may also independently delay the phase of incident light. Light phase-modulated by the k-th active phase modulator 120k may be incident on the passive phase modulator 130.

In the embodiment shown in FIG. 1, the passive phase modulator 130 may serve as a last hidden layer of the optical neural network apparatus 100. Accordingly, the hidden layer of the optical neural network apparatus 100 may include a plurality of active phase modulators, i.e., first to k-th active phase modulators 120a, 120b, . . . , and 120k, and one passive phase modulator 130. The passive phase modulator 130 may locally modulate the phase of incident light depending on positions on a two-dimensional plane, as in the first to k-th active phase modulators 120a, 120b, . . . , and 120k. The passive phase modulator 130 is a transmission-type modulator that transmits and modulates incident light. However, unlike the first to k-th active phase modulators 120a, 120b, . . . , and 120k, the passive phase modulator 130 is not electrically controlled and has a fixed pattern. Accordingly, the degree of phase delay at each position on the two-dimensional plane of the passive phase modulator 130 is fixed and does not change over time.

Figure 3:
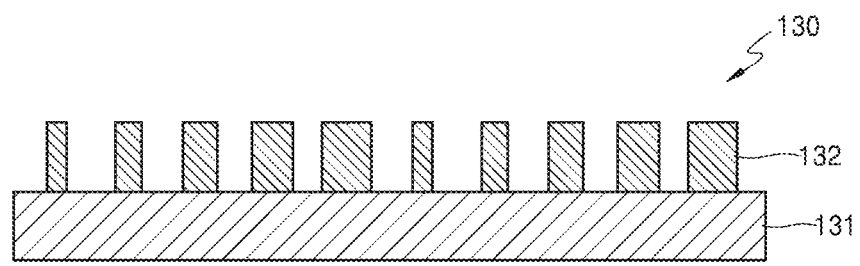
FIG. 3 is a cross-sectional view illustrating the structure of a passive phase modulator of the optical neural network apparatus shown in FIG. 1.

The passive phase modulator 130 may include nanoscale patterns having sizes that are smaller than the wavelength of light used in the optical neural network apparatus 100, for example. For example, FIG. 3 is a cross-sectional view illustrating the structure of the passive phase modulator 130 of the optical neural network apparatus 100 shown in FIG. 1. Referring to FIG. 3, the passive phase modulator 130 may include a substrate 131 that is transparent and a plurality of phase shifting elements 132 arranged on the substrate 131 two-dimensionally. The phase shifting elements 132 may be arranged on the surface of the substrate 131 so as to protrude in the form of pillars. In addition, the phase shifting elements 132 may be arranged at regular intervals or at irregular intervals.

Each of the phase shifting elements 132 may have, for example, a cylindrical shape. However, the shape of each of the phase shifting elements 132 does not necessarily have to be a cylinder, but may be the shape of a radial symmetric polygonal column, such as a square column or a hexagonal column. The phase shifting elements 132 may be easily formed using a general semiconductor patterning process. For example, after a layer of material of the phase shifting elements 132 is stacked on the surface of the substrate 131, the phase shifting elements 132 may be simply formed by patterning the layer of the material by using a photolithographic process and an etching process.

The substrate 131 may include transparent glass or a transparent plastic material, in the form of a flat plate. The phase shifting elements 132 may include a material having a higher refractive index than that of the substrate 131. For example, the phase shifting elements 132 may include a high refractive index material, such as germanium (Ge), amorphous silicon (a-Si), polycrystalline silicon (p-Si), single crystal silicon (c-Si), SiNx, $SiO_2$, TiO, $TiO_2$, $TiO_3$, GaP, $Al_2O_3$, $HfO_2$, or the like.

The sizes of the phase shifting elements 132 may be smaller than the wavelength of light used in the optical neural network apparatus 100. Here, the size of a phase shifting element 132 may refer to its dimension in a direction parallel to a plane of the substrate 131. For example, when each of the phase shifting elements 132 has a cylindrical shape, the diameter of each of the phase shifting elements 132 may range from about 10 nm to about 1,000 nm. Also, when a plurality of phase shifting elements 132 are periodically arranged, the period of the arrangement of the phase shifting elements 132 may be less than the wavelength of light used in the optical neural network apparatus 100. For example, the period of the arrangement of the phase shifting elements 132 may range from about 10 nm to about 1,000 nm.

When incident light passes through a phase shifting element 132 having a nanoscale and a high refractive index, the phase of the incident light is shifted by the phase shifting element 132 and the phase of transmitted light transmitted through the phase shifting element 132 is different from the phase of the incident light. The degree to which the phase varies may be determined by the size and thickness of the phase shifting element 132. When the phase shifting element 132 is a cylindrical or polygonal column, the phase of transmitted light transmitted through the phase shifting element 132 varies depending on the diameter and thickness of the phase shifting elements 132.

Figure 4:
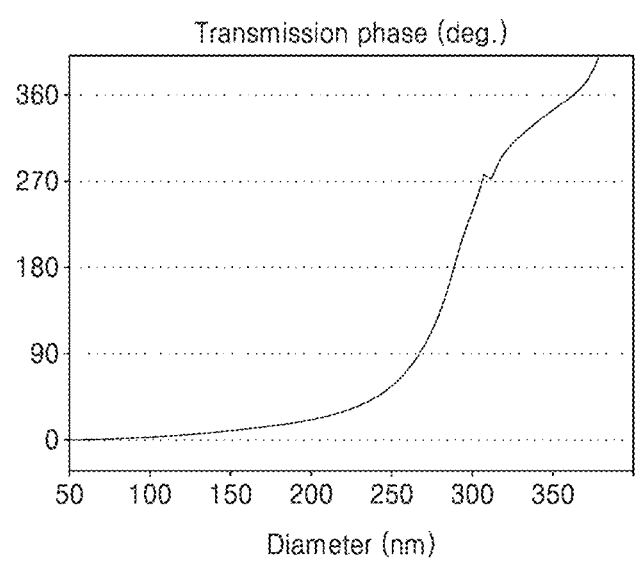
FIG. 4 is a graph showing a relationship between the diameter of one phase shifting element of a passive phase modulator and a change in the phase of transmitted light.

For example, FIG. 4 is a graph showing a relationship between the diameter of one phase shifting element 132 of the passive phase modulator 130 and a change in the phase of transmitted light. Referring to FIG. 4, the diameter of the phase shift element 132 and the phase change have a nonlinear relationship, but the phase change generally increases as the diameter of the phase shifting element 132 increases. The relationship between the diameter of the phase shifting element 132 and the phase change may slightly vary depending on the thickness of the phase shifting element 132 in the traveling direction of incident light, the material of the phase shifting element 132, the period of the arrangement of the phase shifting elements 132, the wavelength of incident light, or the like. However, as the diameter of the phase shifting element 132 increases, the phase change also increases.

Accordingly, when the plurality of phase shifting elements 132 have different diameters or different thicknesses depending on positions on a two-dimensional plane, transmitted light transmitted through the passive phase modulator 130 may have different phases depending on local positions on the passive phase modulator 130. In other words, the phase of the transmitted light changes locally depending on the positions on the passive phase modulator 130.

The sizes or diameters of the plurality of phase shifting elements 132 in the passive phase modulator 130 may be determined based on the value of weights corresponding to a two-dimensional position on the passive phase modulators 130, obtained by pre-learning. For example, after pre-learning of a given task is completed using software or a circuit, the degree of phase delay according to the two-dimensional position on the passive phase modulator 130 may be determined based on the weight of learned data provided by the pre-learning process. The sizes or diameters of the plurality of phase shifting elements 132 may then be determined depending on the two-dimensional distribution of the determined phase delay.

Alternatively, the sizes or diameters of the plurality of phase shifting elements 132 in the passive phase modulator 130 may be randomly and irregularly determined. Determining the two-dimensional distribution of the irregularly determined diameters of the plurality of phase shifting elements 132 in advance, a transfer function according to the position on the two-dimensional plane of the passive phase modulator 130 may be determined. Accordingly, the phase modulation operation of the first to k-th active phase modulators 120a, 120b, . . . , and 120k may be determined considering the transfer function of the passive phase modulator 130 that is determined in advance.

When the passive phase modulator 130 in which the diameters of the plurality of phase shifting elements 132 are irregularly determined is placed in front of the image sensor 140, the passive phase modulator 130 may not be a part of the hidden layer but may be regarded as a function enhancement layer for improving the resolution of an image transmitted to the image sensor 140 between the hidden layer and the image sensor 140. In this case, in the optical neural network apparatus 100 shown in FIG. 1, the hidden layer includes the second to k-th active phase modulators 120b, . . . , and 120k without including the passive phase modulator 130.

The passive phase modulator 130 may modulate the phase with higher resolution than the first to k-th active phase modulators 120a, 120b, . . . , and 120k. The first to k-th active phase modulators 120a, 120b, . . . , and 120k are configured using a liquid crystal or a semiconductor and therefore the reduction in size of each independently driven pixel is limited. Accordingly, in order to increase the number of nodes of the input layer or the hidden layer, it is necessary to increase the number of pixels of the first to k-th active phase modulators 120a, 120b, . . . , and 120k, and accordingly, the sizes of the first to k-th active phase modulators 120a, 120b, . . . , and 120k must increase. On the other hand, the passive phase modulator 130 may control the phase of incident light in a nanoscale range. Accordingly, information throughput may increase by using the passive phase modulator 130 including the phase shifting elements 132 each having a size smaller than the wavelength of light.

In the case of the first to k-th active phase modulators 120a, 120b, . . . , and 120k, since the sizes of pixels are very large as compared with the wavelength of light, an angle at which light is emitted from each pixel of the first to k-th active phase modulators 120a, 120b, . . . , and 120k is not sufficiently large due to a diffraction limit. Accordingly, in order to sufficiently transfer light from each of the first to k-th active phase modulators 120a, 120b, . . . , 120k to the entire layer subsequent thereto, an interval between layers has to be sufficiently wide. On the other hand, the passive phase modulator 130 may transmit light at a sufficiently wide angle beyond the diffraction limit, thereby reducing the necessary distance between the passive phase modulator 130 and the layer subsequent thereto. Accordingly, the thickness of the optical neural network apparatus 100 may be reduced by using the passive phase modulator 130. In addition, the passive phase modulator 130 may transmit light uniformly and with high resolution to the entire region of a layer subsequent to the passive phase modulator 130, thereby improving the reliability of the optical neural network apparatus 100.

Finally, light phase-modulated by the passive phase modulator 130 may be incident on the image sensor 140. A certain interference pattern may be formed on the surface of the image sensor 140 while light beams having different phases, emitted from the passive phase modulator 130 at different positions, interfere with each other. The image sensor 140 may include a plurality of light sensing pixels arranged in two dimensions and may detect the interference pattern by using the plurality of light sensing pixels. The output of the image sensor 140 may be analyzed to confirm an inference result by the optical neural network apparatus 100. Accordingly, the image sensor 140 may serve as an output layer of the optical neural network apparatus 100. Pixels of the image sensor 140 may be nodes of the output layer, respectively. Alternatively, the image sensor 140 may be divided into a plurality of regions, and each of the regions may serve as one node of the output layer.

According to the above-described embodiment, as the first to k-th active phase modulators 120a, 120b, . . . , and 120k and the passive phase modulator 130 each constitute one layer of an artificial neural network and a weight is given in such a manner that the first to k-th active phase modulators 120a, 120b, . . . , and 120k and the passive phase modulator 130 each modulate the phase of incident light, the optical neural network apparatus 100 may serve as an artificial neural network. Accordingly, since the operation of the optical neural network apparatus 100 is performed when light passes through only the first to k-th active phase modulators 120a, 120b, . . . , and 120k and the passive phase modulator 130, no computation is required by a processor and the speed of the artificial neural network may be greatly improved.

According to an embodiment, since information is processed in such a manner that light phase-modulated by one phase modulator is incident on another phase modulator, no physical wiring is required to connect nodes in adjacent layers to each other. Accordingly, the artificial neural network may be implemented with a simple structure.

In the optical neural network apparatus 100 shown in FIG. 1, the input layer and a part of the hidden layer are formed by the first to k-th active phase modulators 120a, 120b, . . . , and 120k and the last hidden layer is formed by the passive phase modulator 130. However, this is only one of various examples of the optical neural network apparatus 100 using the first to k-th active phase modulators 120a, 120b, . . . , and 120k and the passive phase modulator 130 together. It is also possible to configure various other optical neural network apparatuses by variously combining one or more active phase modulators 120a, 120b, . . . , and 120k with one or more passive phase modulators 130.

Figure 5:
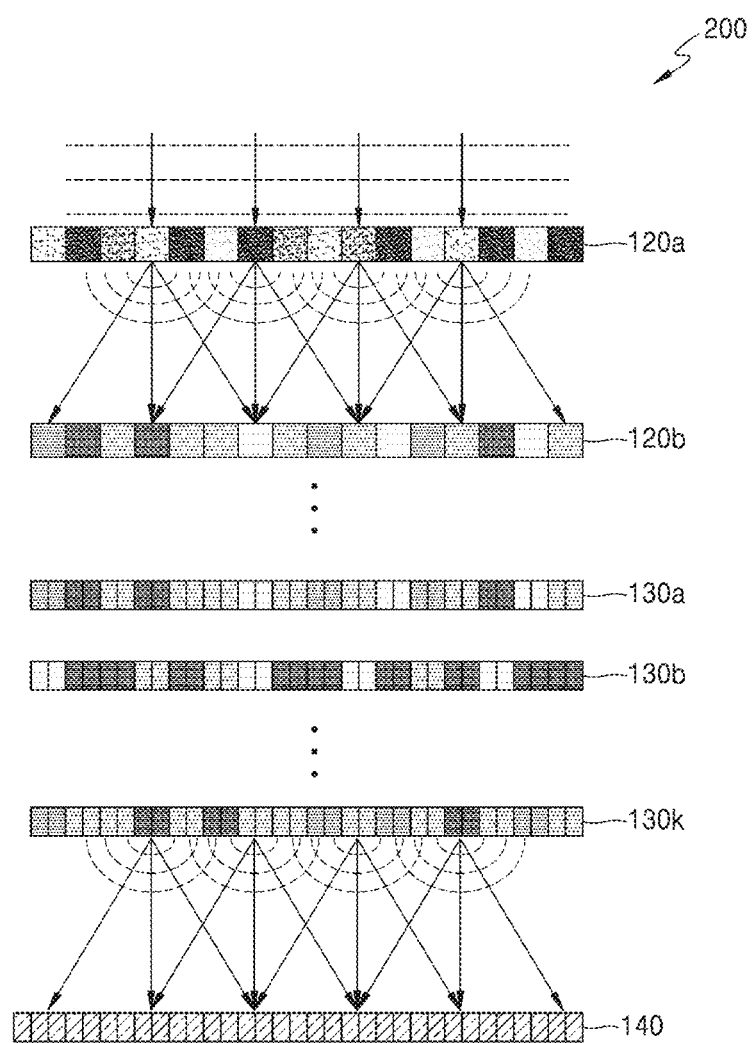
FIG. 5 is a conceptual diagram illustrating a schematic configuration of an optical neural network apparatus according to an embodiment.

For example, FIG. 5 is a conceptual diagram illustrating a schematic configuration of an optical neural network apparatus 200 according to an embodiment. Referring to FIG. 5, the optical neural network apparatus 200 may include a first active phase modulator 120a as an input layer. Also, the optical neural network apparatus 200 may include a second active phase modulator 120b and first to k-th passive phase modulators 130a, 130b, . . . , and 130k as hidden layers. The optical neural network apparatus 200 may include an image sensor 140 as an output layer.

In the optical neural network apparatus 200 shown in FIG. 5, the two-dimensional phase modulation distribution of the first to k-th passive phase modulators 130a, 130b, . . . , and 130k may be determined based on results obtained by learning a given task in advance. In addition, the first and second active phase modulators 120a and 120b may be configured to control the operations of pixels based on values of weights corresponding to two-dimensional positions for the first and second active phase modulators 120a and 120b, respectively, obtained by learning a given task in advance. The first to k-th passive phase modulators 130a, 130b, . . . , and 130k and the first and second active phase modulators 120a and 120b may modulate the phase of incident light differently depending on positions on a two-dimensional plane. In other words, respective phase modulation patterns of the first to k-th passive phase modulators 130a, 130b, . . . , and 130k and the first and second active phase modulators 120a and 120b may be different from each other. When a learning result is changed, a changed learning result may be reflected by adjusting the two-dimensional distribution of weight values of the first and second active phase modulators 120a and 120b.

Alternatively, the k-th passive phase modulator 130k positioned immediately before the image sensor 140 as shown in FIG. 5 may have an irregularly determined two-dimensional phase modulation distribution. In other words, the diameters of a plurality of phase shifting elements 132 of the k-th passive phase modulator 130k may be irregularly determined. In this case, the k-th passive phase modulator 130k may not be regarded as a part of a hidden layer but may be regarded as a function enhancement layer for improving the resolution of an image transmitted to the image sensor 140.

Figure 6:
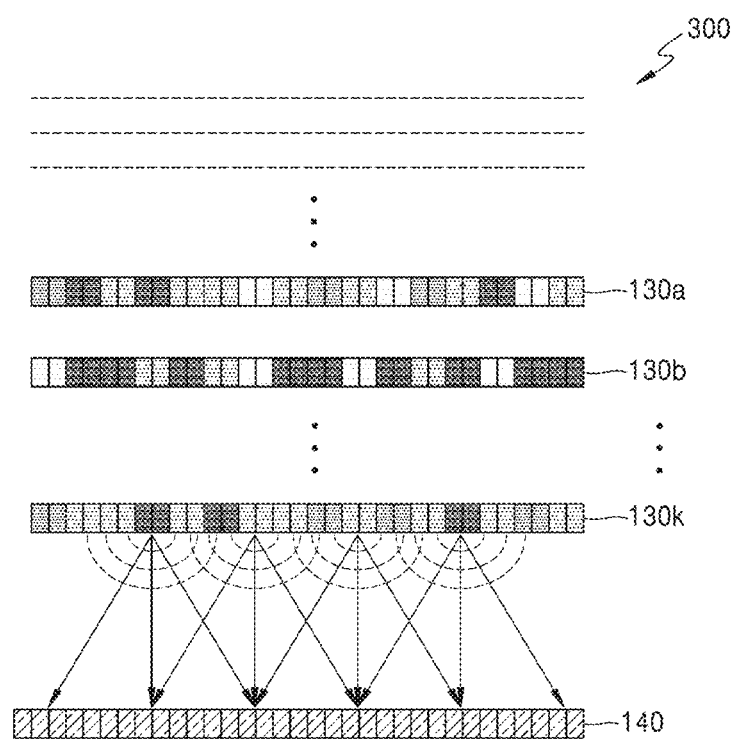
FIG. 6 is a conceptual diagram illustrating a schematic configuration of an optical neural network apparatus according to an embodiment.

FIG. 6 is a conceptual diagram illustrating a schematic configuration of an optical neural network apparatus 300 according to an embodiment. Referring to FIG. 6, the optical neural network apparatus 300 may include only first to k-th passive phase modulators 130a, 130b, . . . , and 130k and an image sensor 140 without including an active phase modulator. In this case, the first passive phase modulator 130a may serve as an input layer of the optical neural network apparatus 300, and the second to k-th passive phase modulators 130b, . . . , 130k may serve as a hidden layer of the optical neural network apparatus 300.

In this structure, the two-dimensional phase modulation distribution of the first to k-th passive phase modulators 130a, 130b, . . . , and 130k may be determined based on results obtained by learning a given task in advance. Alternatively, the k-th passive phase modulator 130k immediately before the image sensor 140 may have an irregularly determined two-dimensional phase modulation distribution. In this case, the k-th passive phase modulator 130k may not be regarded as a part of a hidden layer but may be regarded as a function enhancement layer for improving the resolution of an image transmitted to the image sensor 140.

Figure 7:
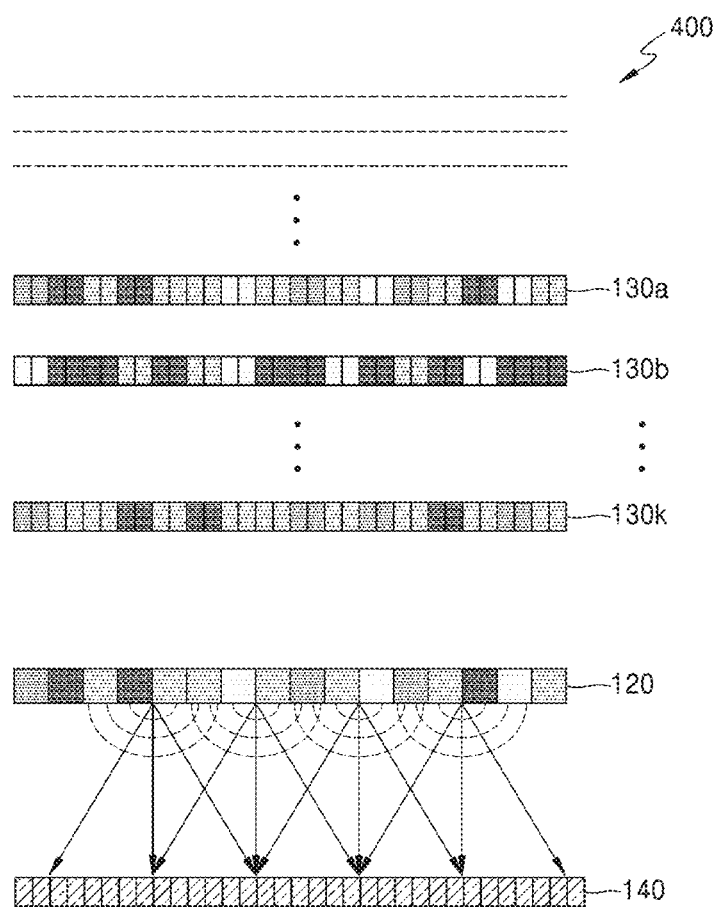
FIG. 7 is a conceptual diagram illustrating a schematic configuration of an optical neural network apparatus according to an embodiment.

FIG. 7 is a conceptual diagram illustrating a schematic configuration of an optical neural network apparatus 400 according to an embodiment. Referring to FIG. 7, the optical neural network apparatus 400 may include first to k-th passive phase modulators 130a, 130b, . . . , and 130k, an active phase modulator 120, and an image sensor 140. In this case, the first passive phase modulator 130a may serve as an input layer of the optical neural network apparatus 400, and the second to k-th passive phase modulators 130b, . . . , and 130k and the active phase modulator 120 may serve as a hidden layer of the optical neural network apparatus 300.

As described above, it is possible to implement an optical neural network apparatus by using only a plurality of passive phase modulators 130, or to implement an optical neural network apparatus by combining at least one passive phase modulator 130 and at least one active phase modulator 120. Also, the arrangement order of the passive phase modulators 130 and the active phase modulator 120 may be variously selected as needed. In addition, a two-dimensional phase modulation distribution may be determined based on results obtained by learning a given task in advance for some of the passive phase modulators 120, and a two-dimensional phase modulation distribution may be randomly and irregularly determined for the other passive phase modulators 120. A passive phase modulator 130 having a randomly determined two-dimensional phase modulation distribution may be placed in front of the image sensor 140 and serve as a function enhancement layer for improving the resolution of an image transmitted to the image sensor 140.

Figure 8:
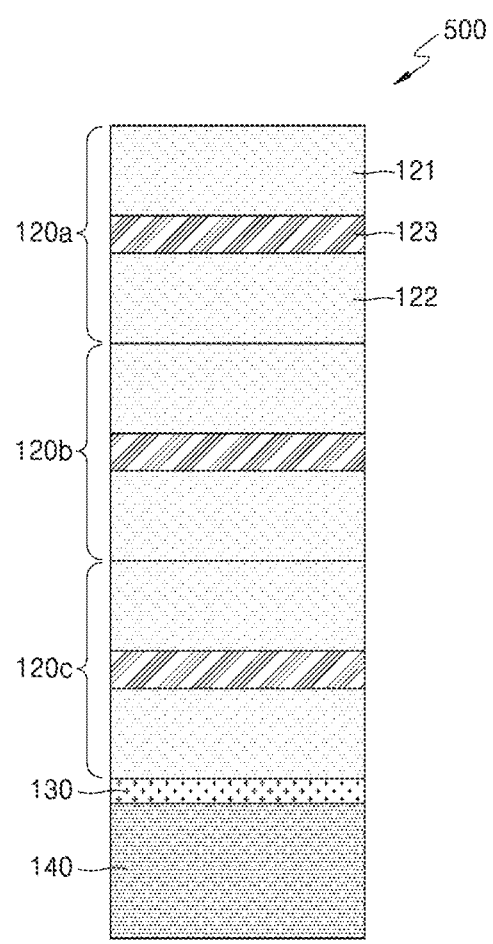
FIG. 8 is a cross-sectional view illustrating the structure of an optical neural network apparatus having a stacked structure according to an embodiment.

The optical neural network apparatuses 100, 200, 300, and 400 may be fabricated in a stacked structure or in a folded structure. For example, FIG. 8 is a cross-sectional view illustrating the structure of an optical neural network apparatus 500 having a stacked structure. Referring to FIG. 8, the optical neural network apparatus 500 may include a passive phase modulator 130 located on an image sensor 140, a third active phase modulator 120c located on the passive phase modulator 120, a second active phase modulator 120b located on the third active phase modulator 120c, and a first active phase modulator 120a located on the second active phase modulator 120b. The first to third active phase modulators 120a, 120b, and 120c and the passive phase modulator 130 are transmission-type modulators that transmit and modulate incident light.

As shown in FIG. 8, the first to third active phase modulators 120a, 120b, and 120c and the passive phase modulator 130 may be directly stacked on the image sensor 140 without a gap therebetween. The passive phase modulator 130 capable of diffusing light at a large angle may have a small thickness and may be located directly on the image sensor 140. Each of the first to third active phase modulators 120a, 120b, and 120c may include a liquid crystal layer 123 and a transparent front substrate 121 and a transparent rear substrate 122 located above and below the liquid crystal layer 123, respectively. The transparent front substrate 121 and the transparent rear substrate 122 of each of the first to third active phase modulators 120a, 120b, and 120c may have a sufficiently large thickness in order to secure a space through which light may be transmitted from each pixel to an entirety of the subsequent phase modulator.

Figure 9:
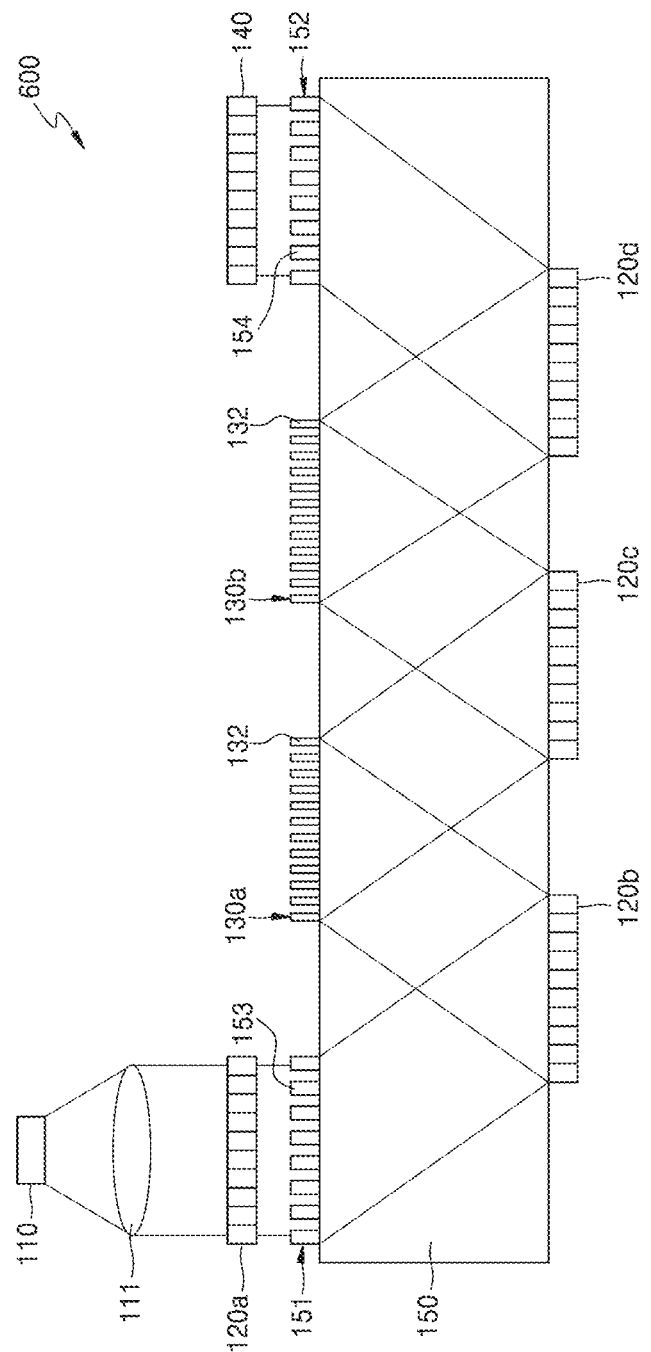
FIG. 9 is a cross-sectional view illustrating the structure of an optical neural network apparatus having a folded structure according to an embodiment.

FIG. 9 is a cross-sectional view illustrating the structure of an optical neural network apparatus 600 having a folded structure according to an embodiment. Referring to FIG. 9, the optical neural network apparatus 600 may include a light guide plate 150 which is transparent and through which light travels, an input coupler 151 located on one side edge region of the upper surface of the light guide plate 150 and guiding incident light to the inside of the light guide plate 150, and an output coupler 152 located on the other side edge region of the upper surface of the light guide plate 150 and outputting light from the light guide plate 150. The optical neural network apparatus 600 may further include a collimating lens 111 facing the input coupler 151 and converting light emitted from a light source 110 into parallel light. When the light source 110 emits collimated light, the collimating lens 111 may be omitted.

The optical neural network apparatus 600 may include first to fourth active phase modulators 120a, 120b, 120c, and 120d, first and second passive phase modulators 130a and 130b, and an image sensor 140. The first active phase modulator 120a, which is an input layer, may be located outside the light guide plate 150 and face the input coupler 151. For example, the first active phase modulator 120a, which serves as the input layer of the optical neural network apparatus 600, may be located between the input coupler 151 and the collimating lens 111. The second to fourth active phase modulators 120b, 120c, and 120d, which serve as hidden layers of the optical neural network apparatus 600, may be sequentially arranged along a light path on the lower surface of the light guide plate 150. The first and second passive phase modulators 130a and 130b, which serve as hidden layers of the optical neural network apparatus 600, may be sequentially arranged along a light path between both side edges of the upper surface of the light guide plate 150 (i.e., on the upper surface of the light guide plate 150 between the input coupler 151 and the output coupler 152).

In this structure, light emitted from the light source 110 passes through the collimating lens 111 and the first active phase modulator 120a and enters the input coupler 151. The input coupler 151 may include a diffraction pattern 153 configured to obliquely divert a traveling direction of incident light to be guided into the light guide plate 150. Light obliquely guided to the inside of the light guide plate 150 by the input coupler 151 is repeatedly reflected on the lower surface and the upper surface of the light guide plate 150 and advances inside the light guide plate 150. In this process, the light may be phase-modulated by the second to fourth active phase modulators 120b, 120c, and 120d and the first and second passive phase modulators 130a and 130b.

For example, light is phase-modulated by the second active phase modulator 120b on the lower surface of the light guide plate 150 and then is phase-modulated in turn by the first passive phase modulator 130a on the upper surface of the light guide plate 150, the third active phase modulator 120c on the lower surface of the light guide plate 150, the second passive phase modulator 130b on the upper surface of the light guide plate 150, and the fourth active phase modulator 120d on the lower surface of the light guide plate 150. Accordingly, the first active phase modulator 120a is a transmission-type modulator that transmits and modulates incident light, and the second to fourth active phase modulators 120b, 120c, and 120d and the first and second passive phase modulators 130a and 130b are reflective spatial light modulators that reflect and modulate incident light.

Light reflected by the fourth active phase modulator 120d is output to the outside of the light guide plate 150 through the upper surface of the light guide plate 150 by the output coupler 152. Then, the light reaches the image sensor 140 which serves as the output layer of the optical neural network apparatus 600. The output coupler 152 may include a diffraction pattern 154 configured to output light obliquely incident on the upper surface of the light guide plate 150 in a direction perpendicular to the upper surface of the light guide plate 150. When each diffraction pattern 154 of the output coupler 152 is configured to be smaller than the wavelength of light used in the optical neural network apparatus 600, the output coupler 152 may also serve as a passive phase modulator. For example, the diffraction pattern 154 may be configured such that the output coupler 152 has an irregularly determined two-dimensional phase modulation distribution. In this case, the output coupler 152 may also serve as a function enhancement layer for improving the resolution of an image transmitted to the image sensor 140.

In another example, the diffraction pattern 154 of the output coupler 152 may have a two-dimensional phase modulation distribution determined based on results obtained by learning a given task in advance. Accordingly, it can be seen that a passive phase modulator is placed at the position of the output coupler 152 and performs the role of the output coupler 152 at the same time.

Figures 10A, 10B, 10C:
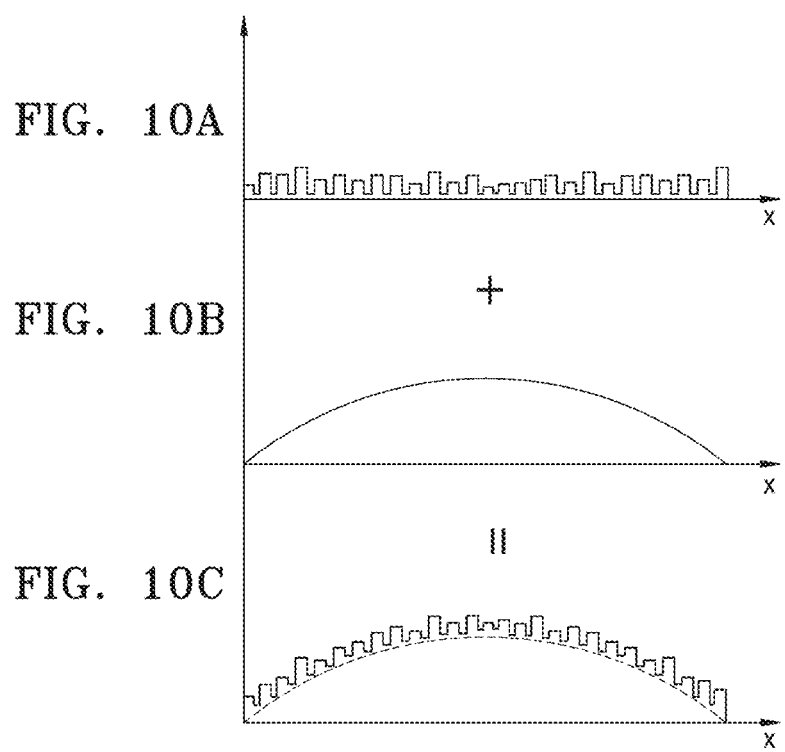
FIGS. 10A, 10B, and 10C are graphs showing a phase delay distribution of a passive phase modulator that may serve as a lens.

Each of the first and second passive phase modulators 130a and 130b includes a plurality of phase shifting elements 132. When a phase delay distribution by the plurality of phase shifting elements 132 is appropriately adjusted, the first and second passive phase modulators 130a and 130b may also serve as a lens for reflecting incident light and collecting diffused light. For example, FIGS. 10A, 10B, and 10C are graphs showing a phase delay distribution of the first and second passive phase modulators 130a and 130b that may serve as a lens. FIG. 10A shows a phase delay distribution corresponding to the pre-learned weights of an artificial neural network. FIG. 10B shows a phase delay distribution that may be used when the first and second passive phase modulators 130a and 130b function as a lens. When the first and second passive phase modulators 130a and 130b have a phase delay distribution obtained by simply adding the phase delay distribution of FIG. 10A and the phase delay distribution of FIG. 10B as shown in FIG. 10C, the first and second passive phase modulators 130a and 130b may both modulate reflected light and serve as a lens for collecting the reflected light into the third and fourth active phase modulators 120c and 120d, respectively.

Figure 11:
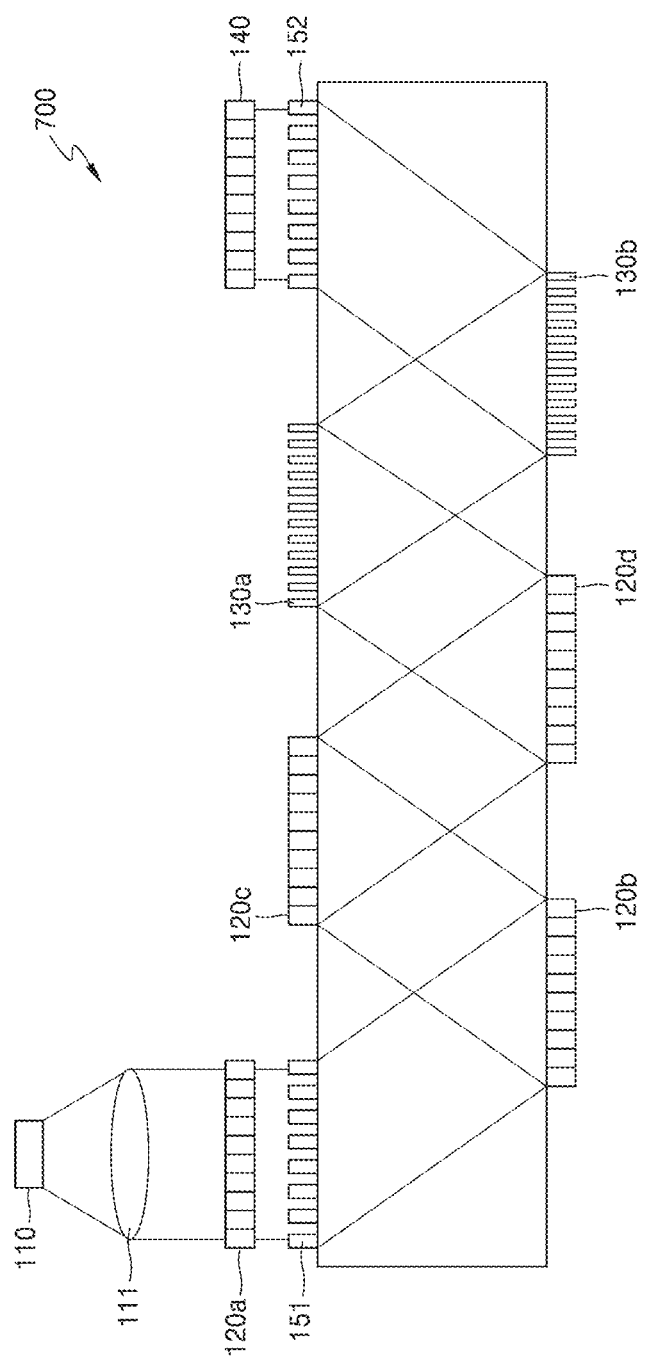
FIG. 11 is a cross-sectional view illustrating the structure of an optical neural network apparatus having a folded structure according to an embodiment.

FIG. 11 is a cross-sectional view illustrating the structure of an optical neural network apparatus 700 having a folded structure according to an embodiment. Referring to FIG. 11, the optical neural network apparatus 700 may include a light guide plate 150, an input coupler 151, an output coupler 152, first to fourth active phase modulators 120a, 120b, 120c, and 120d, first and second passive phase modulators 130a and 130b, and an image sensor 140. Compared with the embodiment shown in FIG. 9, in the optical neural network apparatus 700 shown in FIG. 11, the positions of the third and fourth active phase modulators 120c and 120d and the first and second passive phase modulators 130a and 130b have been changed.

For example, in the optical neural network apparatus 700 shown in FIG. 11, light is phase-modulated by the second active phase modulator 120b on the lower surface of the light guide plate 150 and then is phase-modulated in turn by the third active phase modulator 120c on the upper surface of the light guide plate 150, the fourth active phase modulator 120d on the lower surface of the light guide plate 150, the first passive phase modulator 130a on the upper surface of the light guide plate 150, and the second passive phase modulator 130b on the lower surface of the light guide plate 150. As shown in FIG. 11, an active phase modulator may be located on the upper surface of the light guide plate 150 as well as on the lower surface of the light guide plate 150, and a passive phase modulator may be located on the lower surface of the light guide plate 150 as well as on the upper surface of the light guide plate 150. Besides the locations of the first to fourth active phase modulators 120a, 120b, 120c, and 120d, and first and second passive phase modulators 130a and 130b, the description of the optical neural network apparatus 600 shown in FIG. 9 may be applied to the optical neural network apparatus 700 shown in FIG. 11.

Figure 12:
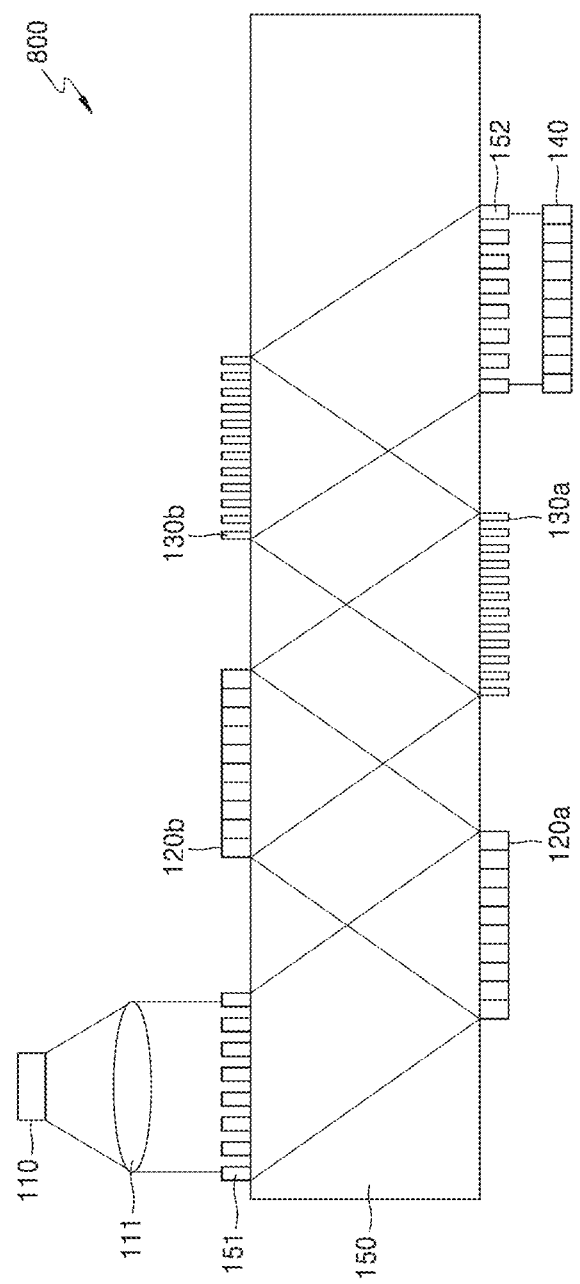
FIG. 12 is a cross-sectional view illustrating the structure of an optical neural network apparatus having a folded structure according to an embodiment.

FIG. 12 is a cross-sectional view illustrating the structure of an optical neural network apparatus 800 having a folded structure according to an embodiment. Referring to FIG. 12, a first active phase modulator 120a serving as an input layer of the optical neural network apparatus 800 may be located on the lower surface of a light guide plate 150 instead of being located outside the light guide plate 150. In this case, light emitted from a light source 110 passes through a collimating lens 111 and an input coupler 151 and then proceeds obliquely to the inside of the light guide plate 150. Then, the light is reflected and phase-modulated by the first active phase modulator 120a, which is an input layer, on the lower surface of the light guide plate 150. Accordingly, the first active phase modulator 120a is a reflective spatial light modulator that reflects and modulates incident light.

Referring to FIG. 12, an output coupler 152 may be located on the lower surface of the light guide plate 150. In this case, light phase-modulated by a second passive phase modulator 130b on the upper surface of the light guide plate 150 may be emitted to the outside of the light guide plate 150 through the lower surface of the light guide plate 150 by the output coupler 152. Otherwise, the description of the optical neural network apparatus 600 shown in FIG. 9 may be applied to the optical neural network apparatus 800 shown in FIG. 12.

In FIGS. 9, 11, and 12, only passive phase modulators or active phase modulators are provided on the upper surface or the lower surface of the light guide plate 150 on an optical path between the input coupler 151 and the output coupler 152. However, at least one of the second to fourth active phase modulators 120b, 120c, and 120d and the first and second passive phase modulators 130a and 130b shown in FIGS. 9, 11, and 12 may be replaced by a diffraction pattern that only serves as a mirror that does not modulate light and simply reflects the light. For example, diffraction patterns at the positions of the first and second passive phase modulators 130a and 130b may be configured to perform only a function of a lens for reflecting light and collecting light.

As described above, in the optical neural network apparatuses 100, 200, 300, 400, 500, 600, 700, and 800, after pre-learning of a given task is completed using software or a circuit, two-dimensional phase modulation distributions of the active phase modulators and the passive phase modulators may be determined based on the weight of learned data. Then, the optical neural network apparatus 100, 200, 300, 400, 500, 600, 700, and 800 may perform inference for a given task at high speed. For example, FIGS. 13 to 17 illustrate the results of inferring handwritten numbers by using the optical neural network apparatuses 100, 200, 300, 400, 500, 600, 700, and 800.

Figure 13:
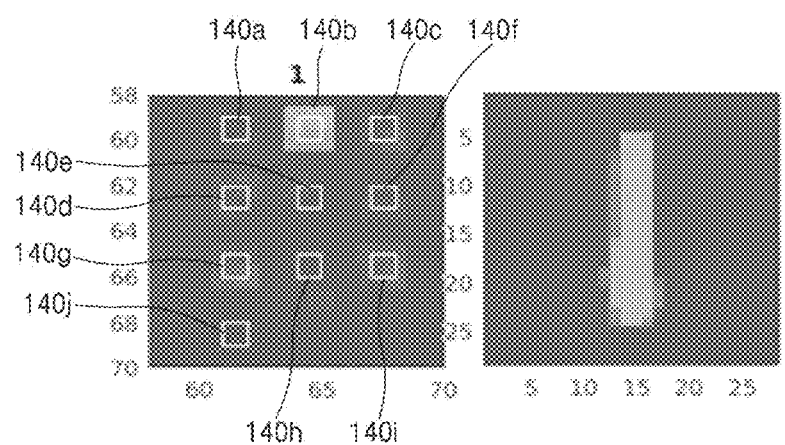
FIGS. 13 to 17 illustrate the results of inferring handwritten numbers by using optical neural network apparatuses.
Figure 14:
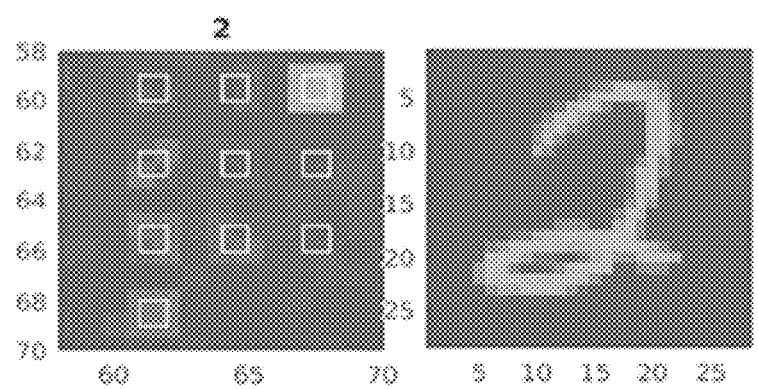
Figure 15:
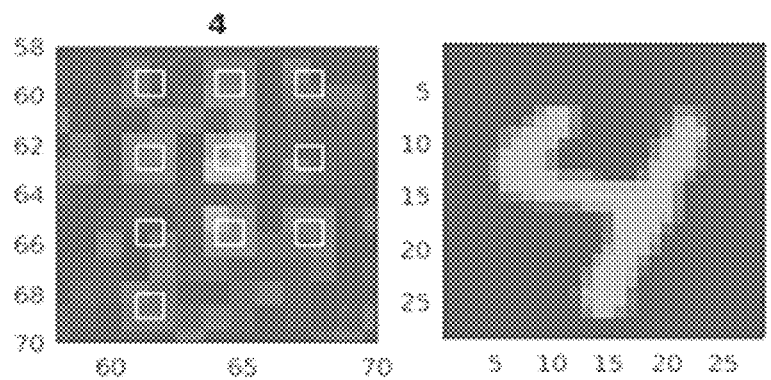
Figure 16:
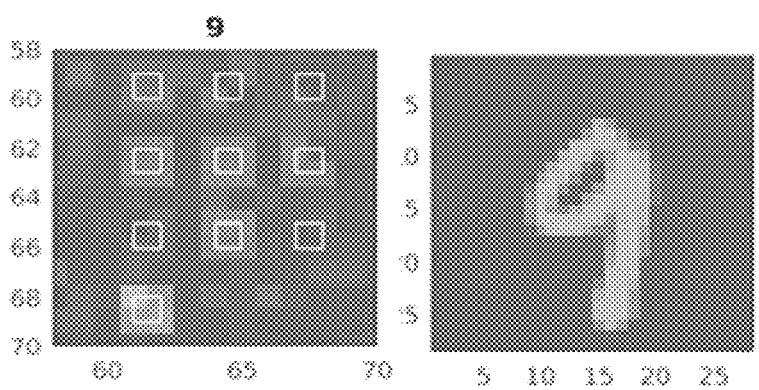
Figure 17:
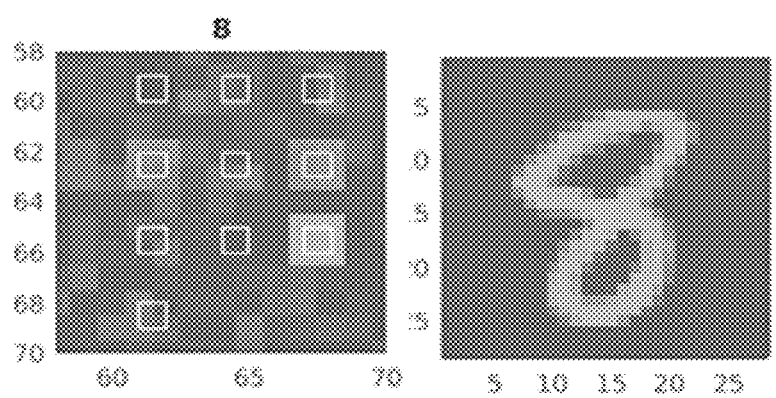

Referring to FIG. 13, ten regions, i.e., first to tenth regions 140a, 140b, 140c, 140d, 140e, 140f, 140g, 140h, 140i, and 140j, of the image sensor 140 shown on the left side are output nodes. During a learning process, learning is performed such that light is transmitted to the first region 140a when the number is '0', light is transmitted to the second region 140b when the number is '1', light is transmitted to the third region 140c when the number is '2', light is transmitted to the fourth region 140d when the number is '3', light is transmitted to the fifth region 140e when the number is '4', light is transmitted to the sixth region 140f when the number is '5', light is transmitted to the seventh region 140g when the number is '6', light is transmitted to the eighth region 140h when the number is '7', light is transmitted to the ninth region 140i when the number is '8', and light is transmitted to the tenth region 140j when the number is '9'.

Accordingly, during an inference process, results may be obtained by detecting a region where light is most transmitted, among the ten regions, that is, the first to tenth regions 140a, 140b, 140c, 140d, 140e, 140f, 140g, 140h, 140i, and 140j, of the image sensor 140. In FIGS. 13 to 17, the left side illustrates the distribution of light transmitted to the image sensor 140 and the right side illustrates an image of a handwritten number. Comparing the left sides to the right sides of FIGS. 13 to 17, it can be seen that the numbers are generally accurately inferred.

It should be understood that the optical neural network apparatuses including the passive phase modulators described according to embodiments should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An optical neural network apparatus comprising:
an input layer, a hidden layer, and an output layer sequentially arranged in a traveling direction of light,
wherein the output layer comprises an image sensor, the image sensor comprising a plurality of light sensing pixels arranged in two dimensions,
wherein the input layer or the hidden layer comprises at least one passive phase modulator configured to modulate a phase of incident light based on an incident position of the incident light on a two dimensional plane of the at least one passive phase modulator,
wherein the at least one passive phase modulator comprises:
a transparent substrate; and
a plurality of phase shifting elements arranged on the substrate,
wherein each phase shifting element from among the plurality of phase shifting elements has a shape of a column arranged on the substrate,
wherein each phase shifting element from among the plurality of phase shifting elements has a respective diameter based on a position of the phase shifting element on the substrate, and
wherein the respective diameter of each phase shifting element from among the plurality of phase shifting elements is based on a respective weight corresponding to the position of the phase shifting element on the substrate.

2. The optical neural network apparatus of claim 1, wherein each phase shifting element from among the plurality of phase shifting elements has a respective refractive index higher than a refractive index of the substrate.

3. The optical neural network apparatus of claim 1, wherein each of respective diameters of the plurality of phase shifting elements is less than a wavelength of incident light incident on the optical neural network apparatus.

4. The optical neural network apparatus of claim 1, wherein each two-dimensional position on the at least one passive phase modulator corresponds to a respective weight obtained by pre-learning.

5. The optical neural network apparatus of claim 1, wherein the plurality of phase shifting elements are regularly two-dimensionally arranged on the substrate.

6. The optical neural network apparatus of claim 5, wherein an arrangement period of the plurality of phase shifting elements is less than a wavelength of the incident light incident on the optical neural network apparatus.

7. The optical neural network apparatus of claim 1, wherein the hidden layer comprises a first hidden layer and a second hidden layer sequentially arranged in the traveling direction of light,
- wherein the input layer comprises at least one input passive phase modulator from among the at least one passive phase modulator,
- wherein the first hidden layer comprises at least one first hidden passive phase modulator from among the at least one passive phase modulator, and
- wherein the second hidden layer comprises at least one second hidden passive phase modulator from among the at least one passive phase modulator.

8. The optical neural network apparatus of claim 7, wherein respective phase modulation patterns of the at least one input passive phase modulator of the input layer, the at least one first hidden passive phase modulator of the first hidden layer, and the at least one second hidden passive phase modulator of the second hidden layer are different from each other.

9. The optical neural network apparatus of claim 1, wherein the input layer or the hidden layer further comprises at least one active phase modulator configured to modulate the phase of the incident light by electrical control and based on an incident position of the incident light on a two dimensional plane of the at least one active phase modulator.

10. The optical neural network apparatus of claim 9, wherein the at least one active phase modulator comprises a spatial light modulator comprising a plurality of pixels arranged in two dimensions,
- wherein each pixel from among the plurality of pixels is configured to independently modulate the phase of the incident light.

11. The optical neural network apparatus of claim 10, wherein each pixel from among the plurality of pixels corresponds to a respective weight obtained by pre-learning, and
- wherein the at least one active phase modulator is configured to control an operation of each pixel from among the plurality of pixels based on the weight.

12. The optical neural network apparatus of claim 9, wherein the hidden layer comprises a first hidden layer and a second hidden layer sequentially arranged in the traveling direction of light,
- wherein the input layer comprises at least one input active phase modulator from among the at least one active phase modulator,
- wherein the first hidden layer comprises at least one first hidden active phase modulator from among the at least one active phase modulator, and
- wherein the second hidden layer comprises at least one second hidden passive phase modulator from among the at least one passive phase modulator.

13. The optical neural network apparatus of claim 12, wherein respective phase modulation patterns of the at least one input active phase modulator of the input layer, the at least one first hidden active phase modulator of the first hidden layer, and the at least one second hidden passive phase modulator of the second hidden layer are different from each other.

14. The optical neural network apparatus of claim 12, wherein the at least one active phase modulator and the at least one passive phase modulator comprise respective transmission-type modulators configured to transmit and modulate the incident light.

15. The optical neural network apparatus of claim 14, wherein the second hidden layer is located between the output layer and the first hidden layer, and
- wherein the first hidden layer is located between the second hidden layer and the input layer.

16. The optical neural network apparatus of claim 9, wherein the hidden layer comprises a first hidden layer and a second hidden layer sequentially arranged in the traveling direction of light,
- wherein the input layer comprises at least one input passive phase modulator from among the at least one passive phase modulator,
- wherein the first hidden layer comprises at least one first hidden passive phase modulator from among the at least one passive phase modulator, and
- wherein the second hidden layer comprises at least one second hidden active phase modulator from among the at least one active phase modulator.

17. The optical neural network apparatus of claim 1, further comprising:
- a transparent light guide plate;
- an input coupler located in a first region on a first surface of the light guide plate to guide incident light into the light guide plate; and
- an output coupler located in a second region on the first surface of the light guide plate to emit light from the light guide plate.

18. The optical neural network apparatus of claim 17, wherein the input layer is located outside the light guide plate and faces the input coupler,
- wherein the hidden layer is located on the first surface of the light guide plate or on a second surface of the light guide plate opposite to the first surface, and
- wherein the output layer is located outside the light guide plate and faces the output coupler.

19. The optical neural network apparatus of claim 17, wherein the hidden layer comprises a first hidden layer and a second hidden layer sequentially arranged in the traveling direction of light,
- wherein the first hidden layer is located on a second surface of the light guide plate opposite to the first surface, and
- wherein the second hidden layer is located between the first region and the second region on the first surface.

20. The optical neural network apparatus of claim 17, wherein the input layer or the hidden layer further comprises at least one active phase modulator configured to modulate the phase of the incident light by electrical control and based on an incident position of the incident light on a two dimensional plane of the at least one active phase modulator.

21. The optical neural network apparatus of claim 20, wherein the at least one active phase modulator and the at least one passive phase modulator comprise respective reflection-type modulators configured to reflect and modulate the incident light.

22. The optical neural network apparatus of claim 17, wherein the output coupler comprises the at least one passive phase modulator.

23. The optical neural network apparatus of claim 17, further comprising:
- a diffraction pattern located on the first surface of the light guide plate or on a second surface of the light guide plate opposite to the first surface, the diffraction pattern being configured to reflect the incident light.

24. The optical neural network apparatus of claim 1, further comprising:
 a transparent light guide plate;
 an input coupler located on a first surface of the light guide plate to guide incident light into the light guide plate; and
 an output coupler located on a second surface of the light guide plate opposite to the first surface to emit light from the light guide plate.

25. The optical neural network apparatus of claim 1, further comprising:
 a light source configured to provide coherent light to the input layer.

26. An optical neural network apparatus comprising:
 a first phase modulator configured to modulate a phase of an incident light ray based on an incident position of the incident light ray on the first phase modulator and to emit a first modulated light ray;
 a second phase modulator configured to modulate a phase of the first modulated light ray emitted by the first phase modulator based on an incident position of the first modulated light ray on the second phase modulator and to emit a second modulated light ray; and
 a sensor configured to sense the second modulated light ray, the sensor comprising a plurality of light sensing pixels arranged in two dimensions,
 wherein one of the first phase modulator and the second phase modulator comprises an active phase modulator,
 wherein the other of the first phase modulator and the second phase modulator comprises a passive phase modulator,
 wherein the passive phase modulator comprises a plurality of columns arranged on a surface of a transparent substrate,
 wherein each column from among the plurality of columns has a respective diameter based on a position of the column on the transparent substrate, and
 wherein the respective diameter of each column from among the plurality of columns is based on a respective weight corresponding to the position of the column on the substrate.

27. The optical neural network apparatus of claim 26, wherein the respective diameter of each column from among the plurality of columns is less than a wavelength of the incident light ray.

28. The optical neural network apparatus of claim 27, wherein an incident position of an incident light ray on the passive phase modulator corresponds to a weight from among a plurality of weights obtained by completion of pre-learning of a task, and
 wherein a diameter of a column from among the plurality of columns located at the incident position is determined according to the corresponding weight.

29. The optical neural network apparatus of claim 26, wherein each position on the first phase modulator and the second phase modulator corresponds to the respective weight from among a plurality of weights obtained by completion of pre-learning of a task, and
 wherein each of the first phase modulator and the second phase modulator is configured to modulate the phase of the incident light ray and the first modulated light ray, respectively, according to the plurality of weights.

30. The optical neural network apparatus of claim 26, further comprising:
 a light guide plate,
 wherein the first phase modulator and the second phase modulator are located on a surface of the light guide plate and configured to modulate and reflect incident light traveling through the light guide plate.

\* \* \* \* \*